United States Patent
Inoue

(10) Patent No.: US 9,007,708 B2
(45) Date of Patent: Apr. 14, 2015

(54) MAGNETIC DISK APPARATUS AND DATA REFRESH METHOD

(75) Inventor: Hiroaki Inoue, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 84 days.

(21) Appl. No.: 13/563,486

(22) Filed: Jul. 31, 2012

(65) Prior Publication Data

US 2013/0194690 A1 Aug. 1, 2013

(30) Foreign Application Priority Data

Jan. 27, 2012 (JP) ................................ 2012-015023

(51) Int. Cl.
| | | |
|---|---|---|
| *G11B 27/36* | (2006.01) | |
| *G11B 5/012* | (2006.01) | |
| *G11B 5/09* | (2006.01) | |
| *G11B 20/10* | (2006.01) | |
| *G11B 20/18* | (2006.01) | |

(52) U.S. Cl.
CPC ............ *G11B 20/1879* (2013.01); *G11B 5/012* (2013.01); *G11B 5/09* (2013.01); *G11B 20/10009* (2013.01)

(58) Field of Classification Search
None
See application file for complete search history.

(56) References Cited

U.S. PATENT DOCUMENTS

| | | | | |
|---|---|---|---|---|
| 6,549,479 B2 * | 4/2003 | Blodgett | ....................... | 365/222 |
| 6,628,466 B2 * | 9/2003 | Alex | ............................... | 360/31 |
| 7,345,837 B1 * | 3/2008 | Schreck et al. | ................ | 360/31 |
| 7,552,273 B2 * | 6/2009 | Otterstedt et al. | ........... | 711/103 |
| 8,154,814 B2 * | 4/2012 | Aoki et al. | ...................... | 360/60 |
| 8,171,211 B2 * | 5/2012 | Walker | ......................... | 711/106 |
| 8,174,780 B1 * | 5/2012 | Tsai et al. | ...................... | 360/31 |
| 8,345,370 B2 * | 1/2013 | Inoue | .............................. | 360/60 |
| 8,531,791 B1 * | 9/2013 | Reid et al. | ....................... | 360/31 |
| 8,806,117 B2 * | 8/2014 | Islam et al. | ................... | 711/106 |
| 2009/0027799 A1 * | 1/2009 | Rothberg et al. | ............... | 360/75 |
| 2009/0244775 A1 * | 10/2009 | Ehrlich | ......................... | 360/135 |
| 2010/0034024 A1 * | 2/2010 | Mochizuki et al. | ...... | 365/185.18 |
| 2010/0128788 A1 * | 5/2010 | Moccagatta et al. | ..... | 375/240.15 |
| 2010/0199106 A1 * | 8/2010 | Iida | .............................. | 713/189 |

FOREIGN PATENT DOCUMENTS

| | | |
|---|---|---|
| JP | 01-205792 | 8/1989 |
| JP | 2010-039983 | 2/2010 |
| JP | 2010-146674 | 7/2010 |

\* cited by examiner

*Primary Examiner* — Dismery Mercedes
(74) *Attorney, Agent, or Firm* — Patterson & Sheridan, LLP

(57) ABSTRACT

According to at least one embodiment, a magnetic disk apparatus includes a disk, a random number generator, a determination module, and a refresh module. The disk includes a plurality of tracks. A random number generator generates a random number within a range of N integers in accordance with writing to a first area of a first track of the plurality of tracks. A determination module determines whether the generated random number includes a predetermined number. A refresh module refreshes a second area of a second track near the first track based on a result of determination of the determination module. The second area corresponds to the first area.

16 Claims, 6 Drawing Sheets

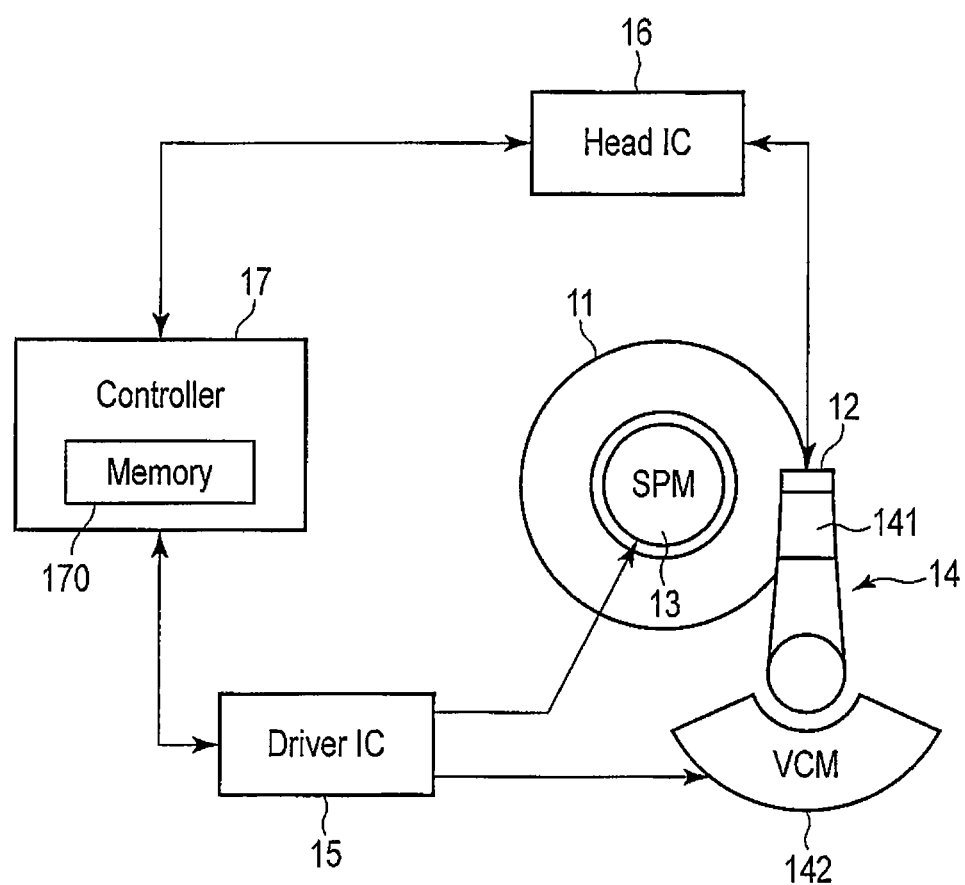
F I G. 1

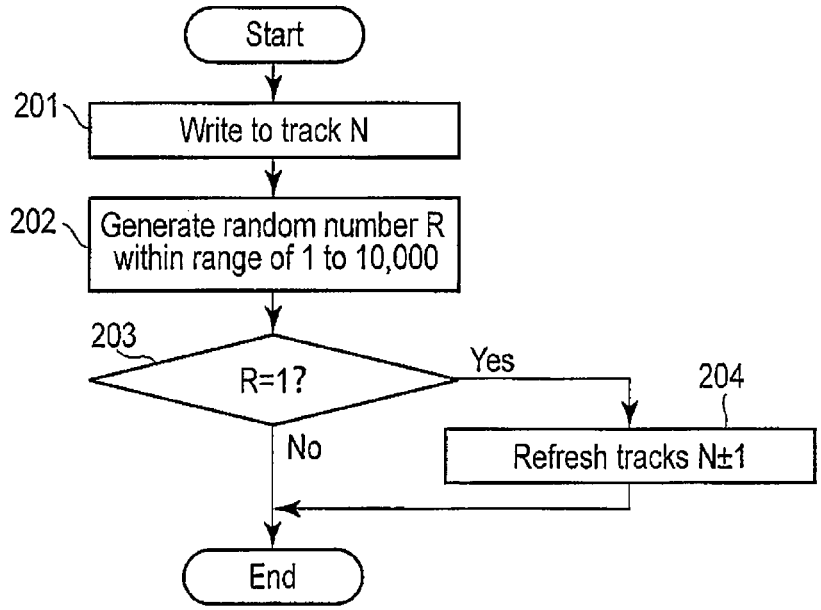
F I G. 2
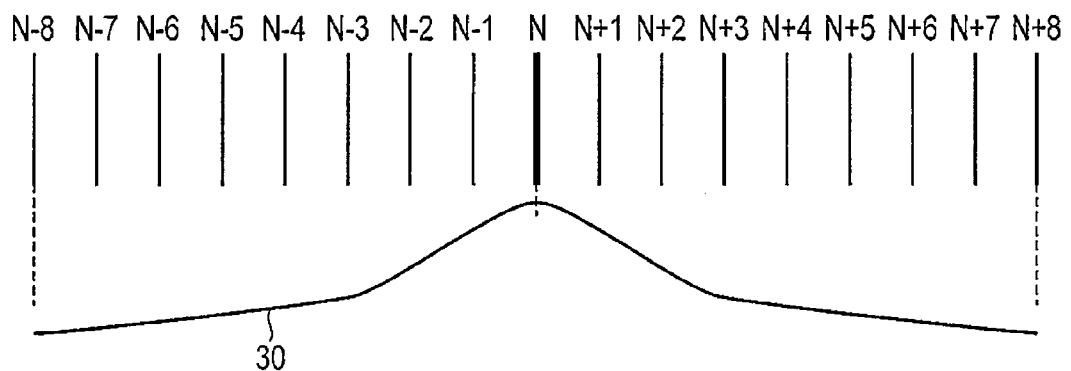
F I G. 3

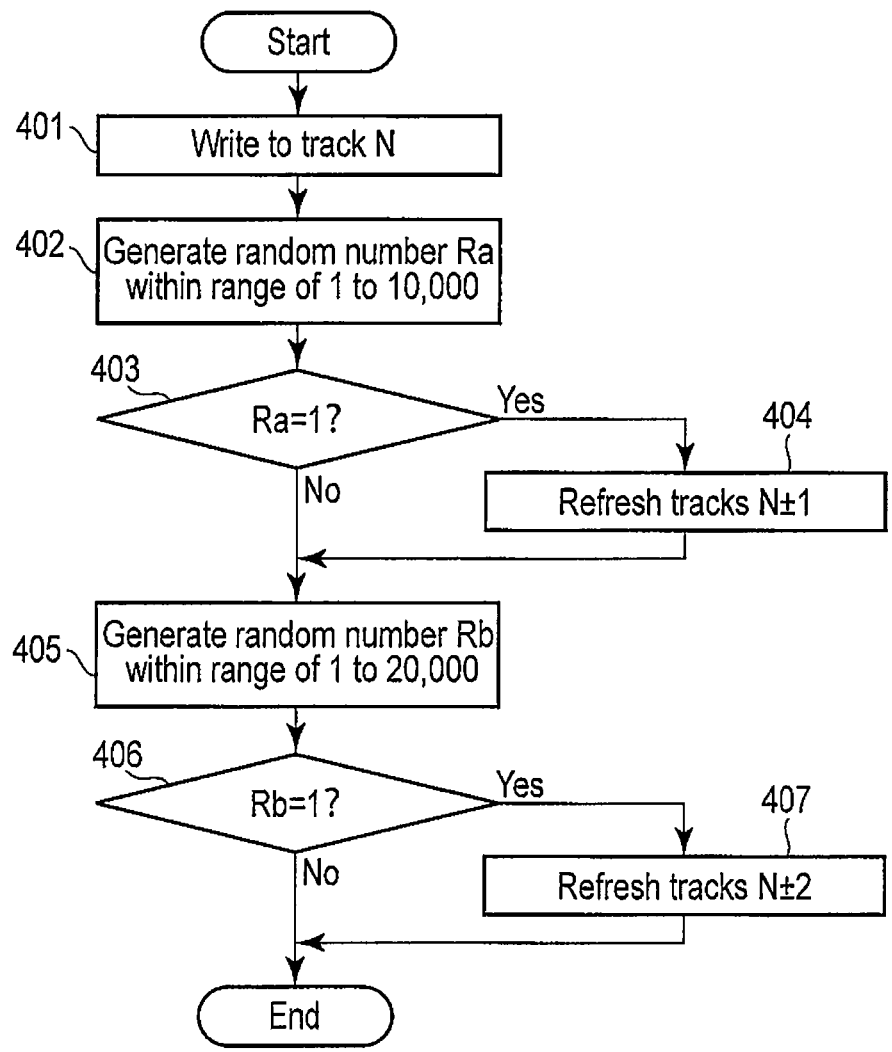
F I G. 4

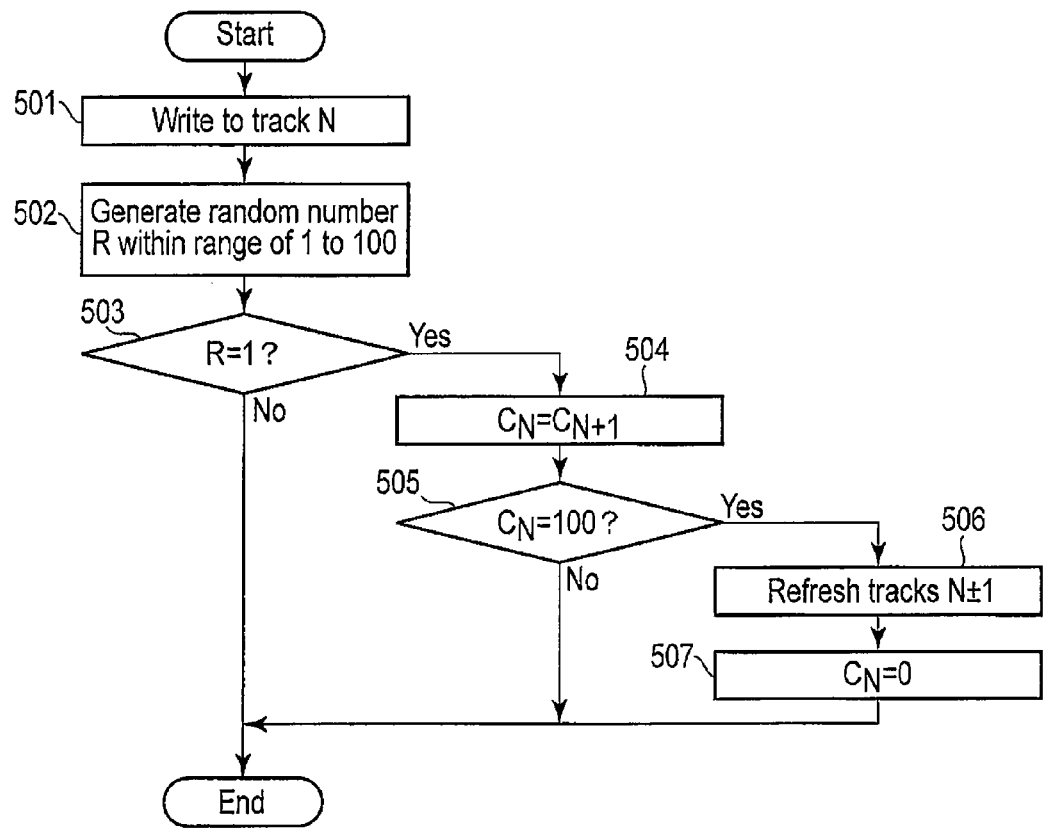
F I G. 5

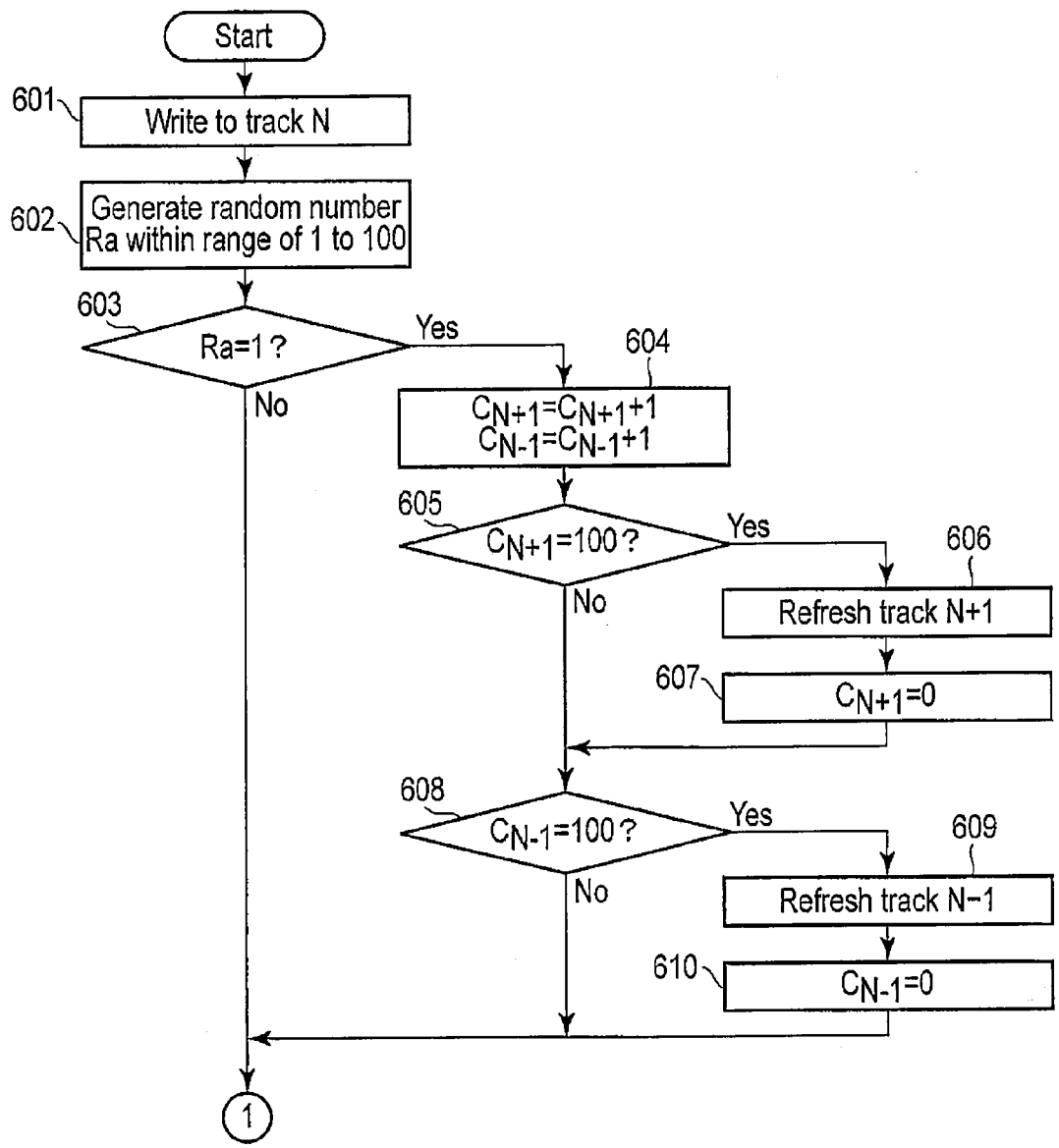
F I G. 6

MAGNETIC DISK APPARATUS AND DATA REFRESH METHOD

CROSS-REFERENCE TO RELATED APPLICATIONS

This application is based upon and claims the benefit of priority from prior Japanese Patent Application No. 2012-015023, filed Jan. 27, 2012, the entire contents of which are incorporated herein by reference.

FIELD

Embodiments described herein relate generally to a magnetic disk apparatus and a data refresh method in the same apparatus.

BACKGROUND

Along with the recent increase in the capacity of a magnetic disk apparatus, the recording density and the track density are also rising. When the track density becomes higher, the interval (that is, track pitch) between neighboring tracks on the disk narrows.

With the narrower track pitch, when magnetically writing data on a track, for example, data (magnetic data) already magnetically written on a neighboring track may suffer magnetic degradation. That is, the magnetic data (more specifically, the strength of the magnetic field of the magnetic data) on the neighboring track may weaken. This phenomenon is called a side-erase effect. The side-erase effect occurs because of an error upon aligning the head with a target track and a magnetic field that leaks from the head.

Even when the magnetic data of the corresponding track weakens because of the side-erase effect, no read error occurs immediately. When the side-erase effect repetitively occurs, the magnetic data of the corresponding track gradually weakens. If the number of times of side-erase effect occurrence exceeds a predetermined threshold, it is difficult to recover the magnetic data by an attempt using error correction codes (ECCs) to the maximum, resulting in a read error. As a result, the magnetic data is lost.

In a recent magnetic disk apparatus, data refresh is becoming indispensable to recover magnetic degradation of magnetic data before reading the magnetic data from the track becomes impossible because of the repetitive side-erase effect. Data refresh is known as an operation of reading magnetically degraded magnetic data from the corresponding track and writing the read magnetic data again to the track. The rewrite (that is, data refresh) of the magnetic data strengthens and stabilizes magnetic field of the magnetic data.

The track where the side-erase effect repetitively occurs and the number of data writing to a track adjacent to that track have correlation. A conventional magnetic disk apparatus uses a technique of counting the write count for each track or each group on the disk to use the above-described correlation. This technique refreshes data of a track adjacent to a track where the write count has reached a threshold or data of all tracks belonging to a group where the write count has reached a threshold.

In the above-described related art, a memory such as a dynamic RAM (DRAM) is used to hold the write count of each track or each group (that is, for a predetermined recording unit). In general, the smaller the recording unit to count the write count is, the larger the memory capacity necessary for holding the write count is. On the other hand, the larger the recording unit to count the write count is, the larger the number of times of unnecessary data refresh is.

BRIEF DESCRIPTION OF THE DRAWINGS

FIG. 1 is an exemplary block diagram showing a typical arrangement of a magnetic disk apparatus according to an embodiment.

FIG. 2 is an exemplary flowchart illustrating a typical procedure of data write processing including refresh according to the embodiment.

FIG. 3 is an exemplary view showing an example of spread of a leakage magnetic field caused by data writing to a track N according to the embodiment.

FIG. 4 is an exemplary flowchart illustrating a typical procedure of data write processing including refresh according to a first modification of the embodiment.

FIG. 5 is an exemplary flowchart illustrating a typical procedure of data write processing including refresh according to a second modification of the embodiment.

FIG. 6 is an exemplary flowchart illustrating a typical procedure of the first half of data write processing including refresh according to a third modification of the embodiment.

DETAILED DESCRIPTION

Figure 7:
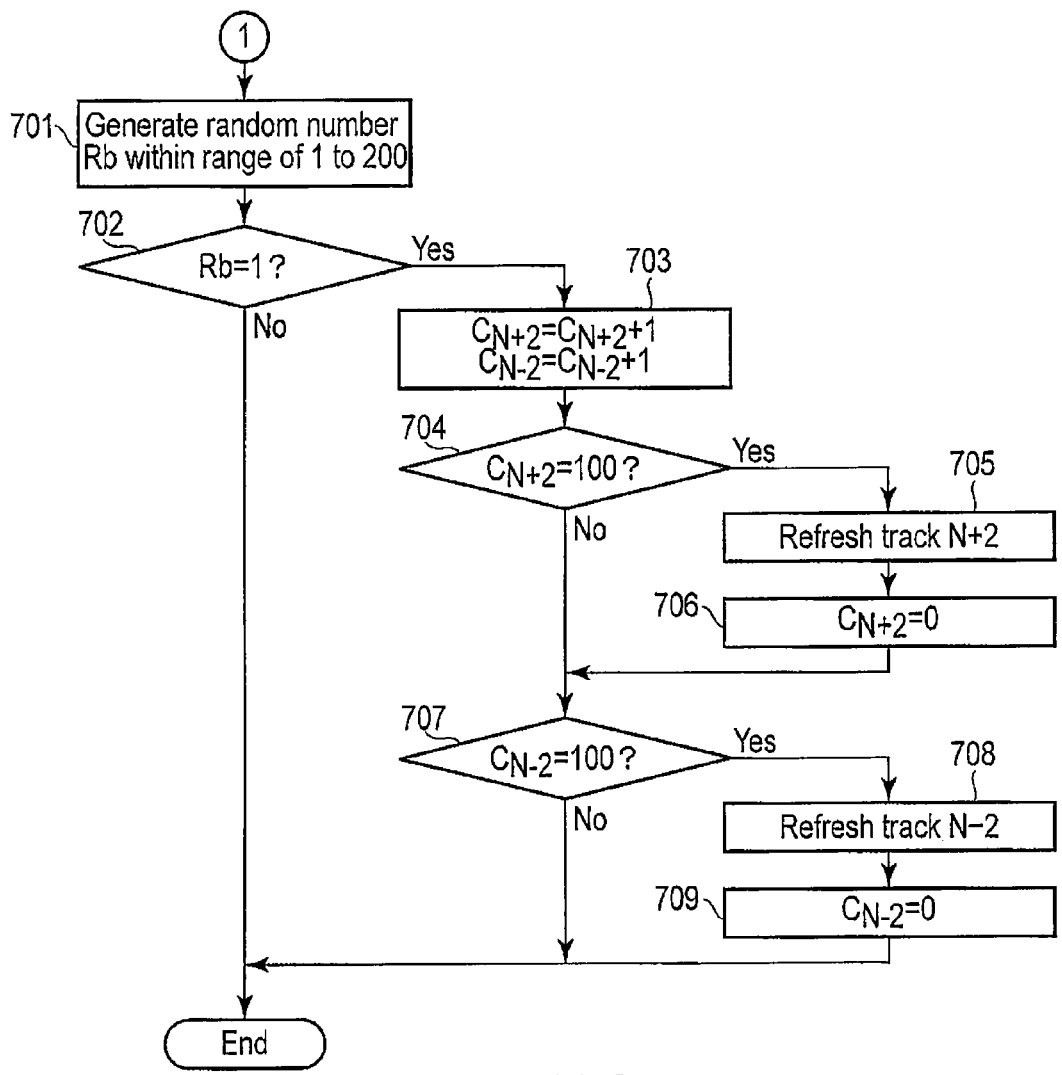
FIG. 7 shows an exemplary flowchart illustrating a typical procedure of a second half of the data write processing including refresh according to the third modification.

In general, according to one embodiment, a magnetic disk apparatus includes a disk, a random number generator, a determination module, and a refresh module. The disk comprises a plurality of tracks. A random number generator generates a random number within a range of N integers in accordance with writing to a first area of a first track of the plurality of tracks. A determination module determines whether the generated random number comprises a predetermined number. A refresh module refreshes a second area of a second track near the first track based on a result of determination of the determination module. The second area corresponds to the first area.

Various embodiments will be described hereinafter with reference to the accompanying drawings.

FIG. 1 is a block diagram showing a typical arrangement of a magnetic disk apparatus according to an embodiment.

The magnetic disk apparatus shown in FIG. 1 includes a disk (magnetic disk) 11, a head (magnetic head) 12, a spindle motor (SPM) 13, an actuator 14, a driver IC 15, a head IC 16, and a controller 17.

The disk 11 is a magnetic recording medium. The disk 11 has two disk surfaces on the upper and lower sides. For example, the upper disk surface of the disk 11 serves as a recording surface on which data is magnetically recorded. The recording surface (recording area) of the disk 11 includes, for example, concentric tracks. Each of the tracks includes sectors that are minimum recording units.

The head (head slider) 12 is arranged in correspondence with the recording surface of the disk 11. The head 12 includes a write element and a read element (neither are shown). The head 12 (more specifically, write element and read element) is used to write data to the disk 11 and read data from the disk 11.

In the arrangement of FIG. 1, a magnetic disk apparatus includes the single disk 11. However, the magnetic disk apparatus may include a plurality of stacked disks 11. In the arrangement of FIG. 1, one of the surfaces of the disk 11 serves as a recording surface. However, each surface of the disk 11 may serve as a recording surface, and the head 12 may be arranged in correspondence with each recording surface.

The SPM 13 rotates the disk 11 at a high speed. The SPM 13 is driven by a driving current (or driving voltage) supplied from the driver IC 15. The head (head slider) 12 is attached to the distal end of an arm 141 of the actuator 14. The actuator 14 includes a voice coil motor (VCM) 142 serving as its driving source. The VCM 142 is driven by a driving current supplied from the motor driver IC 15. When the VCM 142 drives the actuator 14, the head 12 moves along an arc on the disk 11 in its radial direction.

The driver IC 15 drives the SPM 13 and the VCM 142 under the control of the controller 17. The head IC 16 also called a head amplifier amplifies the signal (that is, read signal) read by the head 12. The head IC 16 also converts write data output from the controller 17 into a write current and outputs it to the head 12.

The controller 17 is implemented by, for example, a system LSI formed by integrating a plurality of elements including an MPU (Microprocessor Unit) on a single chip. The controller 17 includes a memory 170 such as a DRAM.

The controller 17 has a read/write channel (not shown) for processing a signal concerning read/write. That is, the controller 17 (read/write channel) converts the read signal amplified by the head IC 16 into digital data. The controller 17 (read/write channel) decodes the digital data to reproduce read data. The controller 17 also extracts servo data from the digital data. The controller 17 also encodes write data and transfers the encoded write data to the head IC 16.

The controller 17 is connected to a host apparatus (hereinafter, referred as host) via a host interface. The host uses the magnetic disk apparatus shown in FIG. 1 as the storage apparatus of its own. The host and the magnetic disk apparatus shown in FIG. 1 are included in an electronic apparatus such as a personal computer, a video camera, a music player, a mobile terminal, a cellular phone, or a printer apparatus.

The controller 17 functions as a host interface controller that transmits/receives a signal to/from the host. More specifically, the controller 17 receives commands (write command, read command, and the like) transferred from the host. The controller 17 also controls data transfer between the controller and the host. The controller 17 also functions as a disk interface controller that controls data writing to the disk 11 via the head IC 16 and the head 12 and reading from the disk 11 via the head IC 16 and the head 12.

In addition, every time data writing to a track N occurs, the controller 17 determines whether to refresh, for example, tracks N+1 and N-1 (to be expressed as tracks N±1 hereinafter) adjacent to the track N. The controller 17 refreshes the data of the tracks N±1 based on the determination result.

The criterion of the determination will be explained below.

For example, it is assumed that the data writing to the track N causes a side-erase effect. When the side-erase effect repetitively occurs, the magnetic data of the neighboring tracks N±1 gradually weaken. After a while, normal reading from the neighboring tracks N±1 becomes impossible.

The number of the data writing to the track N, which makes it impossible to normally read data from the neighboring tracks N±1, is represented by C. Based on C and a margin Δ, an allowable write count (that is, threshold) $C_P$ ($C_P = C - \Delta$) to the track N is set. If the number of data writings to the track N exceeds the threshold $C_P$, the possibility the magnetic data of the neighboring tracks N±1 are lost increases. The threshold $C_P$ can be said to be an index representing the strength of the magnetic disk apparatus to the side-erase effect. In this embodiment, the threshold $C_P$ is the indirect criterion of the determination. The reason will be described below.

In the above-described related art, the data writing is counted for, for example, each track. Data of tracks adjacent to a track where the write count has reached the threshold (to be referred to as a refresh threshold hereinafter) $C_P$ is refreshed. This allows to prevent the data of the neighboring track from being lost. However, to count the write count for each track, a memory area to hold the write counts of all tracks on the disk is necessary. It is assumed that the threshold $C_P$ is 10,000. In this case, to accurately count the write count up to 10,000, a 14-bit memory area is necessary per track. This is apparent from $2^{14} = 16,384$. For this reason, when the track density rises, as in the recent magnetic disk apparatus, the memory capacity necessary for holding the write counts of all tracks on the disk greatly increases.

In this embodiment, the controller 17 is configured to generate a random number R within the range of integers from 1 to 10,000 every time the data writing to the track N occurs, instead of counting the write count for each track. That is, the controller 17 randomly generates one of integers from 1 to 10,000 with an occurrence probability of $1/10,000$ every time the data is written to the track N. Therefore, any one of integers from 1 to 10,000 is generated once during 10,000 generations of the random number. Therefore, if the refresh operation is to be performed when the generated number R is a predetermined number from 1 to 10,000 (for example, 1), the refresh can be performed before the write count reaches 10,000.

Stated another way, if the generated random number R is the predetermined value (for example, 1), the controller 17 estimates (that is, determines) that the number of the data writing to the track N has reached 10,000 (refresh threshold). In this case, the controller 17 refreshes the neighboring tracks N±1. The generated random number R is the predetermined value at a probability of one in 10,000 data writings to the track N, as is apparent. Hence, when the random number R generated in accordance with the data writing to the track N is the predetermined value, the controller 17 can estimate that the number of the data writing to the track N has reached 10,000.

A typical procedure of the data write processing including refresh according to this embodiment will be described below with reference to the flowchart of FIG. 2 by exemplifying the data writing to the track N. It is assumed that the threshold $C_P$ is 10,000. That is, it is assumed that the allowable write count representing the strength of the magnetic disk apparatus shown in FIG. 1 to the side-erase effect is 10,000.

First, the controller 17 writes data to the track N on the disk 11 via the head IC 16 (block 201). The data writing to the track N includes the data writing not only to the entire track N (entire first area) but also to a partial area (part of the first area) of the track N.

Next, the controller 17 functions as the random number generation module to generate the random number R within the range of integers (that is, $C_P$ integers) from 1 to 10,000 ($C_P = 10,000$) (block 202). The controller 17 then functions as a random number determination module to determine whether the generated random number R is the predetermined value, for example, 1 (block 203). Note that the predetermined value may be an integer other than 1 as long as it is an integer within the range of 1 to 10,000.

If the generated random number R is not 1 (NO in block 203), the controller 17 estimates that the number of the data writing to the track N has not reached 10,000 (refresh threshold $C_P$), based on the probability that the random number R is 1. In this case, the controller 17 ends the data write processing according to the flowchart of FIG. 2.

On the other hand, if the generated random number R is 1 (YES in block 203), the controller 17 estimates that the number of the data writing to the track N may reach 10,000 (refresh threshold $C_F$), based on the probability that the random number R is 1. For example, after the track N has been refreshed, the estimated number of the data writing to the track N is the write count after the preceding refresh of the track N.

If the determination of block 203 ends with "YES", as described above, the controller 17 functions as the refresh module to refresh the tracks N±1 adjacent to the track N written in block 201 (block 204). That is, the controller 17 reads data $D_{N+1}$ and $D_{N-1}$ from the tracks N+1 and N−1, respectively, and writes the read data $D_{N+1}$ and $D_{N-1}$ to the tracks N+1 and N−1 again. After refreshing the tracks N±1 (block 204), the controller 17 ends the data write processing according to the flowchart of FIG. 2.

As described above, in this embodiment in which the random number R is generated within the range of integers from 1 to 10,000 in each data writing to the track N, the probability that the random number R is 1 at the time of the data writing to the track N is 1/10,000. Hence, the controller 17 refreshes the tracks N±1 at a probability of 1/10,000 at the time of the data writing to the track N. That is, the tracks N±1 adjacent to track N are refreshed before the write count for the track N reaches 10,000. For this reason, there is no fear of loss of the data of the tracks N±1.

According to this embodiment, as described above, the random number R is generated with an occurrence probability of 1/10,000 every time the data is written to the track N. When the generated random number R is 1 (the predetermined value), the neighboring tracks N±1 are refreshed. That is, this embodiment does not need the technique of counting the write count for each track while applying the arrangement for managing the refresh on the track basis. Hence, according to this embodiment, the memory capacity needed for holding the write count is unnecessary. Additionally, in this embodiment, since the refresh is managed on the track basis, unnecessary data refresh can be suppressed as compared to an arrangement for managing the refresh on the group basis to reduce the above-described memory capacity. It is therefore possible to minimize the decrease in performance caused by data refresh.

In this embodiment, when the data writing to track N+1 adjacent to the track N is also needed, as in sequential data writing, the controller 17 executes the same data write processing as described above for the track N+1. If the random number R generated after the data writing to the track N+1 is 1, the controller 17 refreshes track N+2 and the track N adjacent to the track N+1.

<First Modification>

The first modification of the embodiment will be described next.

The above-described embodiment considers a case in which the side-erase effect caused by the data writing to the track N affects the tracks N±1 adjacent to the track N. However, the influence of the side-erase effect may reach tracks N±2 farther than the tracks N±1 from the track N or tracks farther than the tracks N±2 from the track N.

FIG. 3 is a view for explaining a typical range of the influence of the side-erase effect according to the embodiment, and illustrates an example of spread of the leakage magnetic field caused by the data writing to the track N. In an example of a leakage magnetic field distribution 30 shown in FIG. 3, the tracks N±1 adjacent to the track N are most affected by the side-erase effect. The influence of the side-erase effect weakens as the distance from the track N increases. However, the strength of the leakage magnetic field on the tracks N±2 is about 50% of that on the tracks N±1 and cannot therefore be neglected.

The first modification applies the data write processing in consideration of a case in which the side-erase effect caused by the data writing to the track N affects not only the tracks N±1 adjacent to the track N but also the tracks N±2. It is assumed that the influence of the side-erase effect on the tracks N±2 caused by the data writing to the track N is 50% of that on the tracks N±1. That is, It is assumed that the weight of the influence of the side-erase effect on the tracks N±2 is half that on the tracks N±1.

A typical procedure of the data write processing including the refresh according to the first modification will be described below with reference to the flowchart of FIG. 4 by exemplifying the data writing to the track N. In this case, it is assumed that the influence of the side-erase effect on the tracks N±1 caused by the data writing to the track N is the same as in the above-described embodiment. That is, it is assumed that the tracks N±1 need to be refreshed once in every 10,000 data writing to the track N. In this case, the tracks N±2 for which the weight is half that on the tracks N±1 are refreshed once in every 20,000 data writing to the track N.

First, the controller 17 writes data to the track N (block 401). Next, the controller 17 functions as the random number generation module to generate a random number Ra, one of integers from 1 to 10,000, with an occurrence probability of 1/10,000 every time the data is written to the track N (block 402). The controller 17 then functions as a random number determination module to determine whether the generated random number Ra is the predetermined value, for example, 1 (block 403). If the generated random number Ra is 1 (YES in block 403), the controller 17 functions as the refresh module to refresh the tracks N±1 (block 404). The processing up to this point (blocks 401 to 404) is the same as in blocks 201 to 204 of the above-described embodiment.

After the controller 17 refreshing the tracks N±1 (block 404), the process advances to block 405. On the other hand, if the generated random number Ra is not 1 (NO in block 403), the process advances to block 405 without refreshing the tracks N±1.

In block 405, the controller 17 functions as the random number generation module again to generate a random number Rb, one of integers from 1 to 20,000, with an occurrence probability of 1/20,000 every time the data is written to the track N. Note that the range of the random number Rb is twice that of the random number Ra. The controller 17 then functions as a random number determination module to determine whether the generated random number Rb is the predetermined value, for example, 1 (block 406).

If the generated random number Rb is not 1 (NO in block 406), the controller 17 estimates that the number of data writings to the track N has not reached 20,000, based on the probability that the random number Rb is 1. In this case, the controller 17 ends the data write processing according to the flowchart of FIG.

On the other hand, if the generated random number Rb is 1 (YES in block 406), the controller 17 estimates that the number of data writings to the track N may reaches 20,000, based on the probability that the random number Rb is 1. In this case, the controller 17 functions as the refresh module to refresh the tracks N±2 (block 407). That is, the controller 17 reads data $D_{N+2}$ and $D_{N-2}$ from the track N+2 and the track N−2, respectively, and writes the read data $D_{N+2}$ and $D_{N-2}$ to the track N+2 and the track N−2 again. After refreshing the tracks N±2 (block 407), the controller 17 ends the data write processing according to the flowchart of FIG. 4.

As described above, in the first modification in which the random number Rb is generated within 'the range of integers from 1 to 20,000 in each data writing to the track N, the probability that the random number Rb is 1 at the time of the data writing to the track N is 1/20,000. Hence, the controller 17 refreshes the tracks N±2 at a probability of 1/20,000 at the time of the data writing to the track N. That is, the tracks N±2 are refreshed before the write count for the track N reaches 20,000. For this reason, there is no fear of loss of the data of the tracks N±2 because of the side-erase effect caused by the data writing to the track N.

Note that in the first modification, the influence of the side-erase effect on tracks N±3 caused by data writing to the track N can also be taken into consideration. If the influence of the side-erase effect on tracks N±3 is, for example, 10% that on the tracks N±1, the controller 17 generates a random number Rc within the range of integers from 1 to 100,000 in each data writing to the track N.

<Second Modification>

The second modification of the embodiment will be described next.

In the second modification, generation of the random number R and counting of the write count for each track are combined. In the second modification, the normalized write count of each track is held in a partial area (to be referred to as a write count table area hereinafter) of the memory 170 in the controller 17. In the second modification, the maximum value of the normalized write count of each track held in the write count table area is 100. For example, let $C_N$ be the normalized write count of the track N, the number of the data writing to the track N (more specifically, estimated number of times) is given by $100 \times C_N$.

A typical procedure of the data write processing including the refresh according to the second modification will be described below with reference to the flowchart of FIG. 5 by exemplifying the data writing to the track N. In this case, it is assumed that the influence of the side-erase effect on the tracks N±1 caused by the data writing to the track N is the same as in the above-described embodiment. That is, it is assumed that the refresh threshold $C_P$ is 10,000, and the tracks N±1 need to be refreshed once in 10,000 data writing to the track N.

First, the controller 17 writes data to the track N (block 501). Next, the controller 17 functions as the random number generation module to generate the random number R within the range of 1 to 100 with an occurrence probability of 1/100 every time the data is written to the track N (block 502). In the second modification, the range of the generated random number R is 1/100 that of the above-described embodiment.

The controller 17 then functions as a random number determination module to determine whether the generated random number R is the predetermined value, for example, 1 (block 503). If the generated random number R is not 1 (NO in block 503), the controller 17 ends the data write processing according to the flowchart of FIG. 5.

On the other hand, if the generated random number R is 1 (YES in block 503), the controller 17 functions as an increment module to increment write count $C_N$ of the track N by one (block 504). The write count $C_N$ is held in association with the track N in the write count table area of the memory 170. The probability that the random number R generated in block 502 is 1 is 1/100. Hence, the controller 17 increments the write count $C_N$ of the track N at least once in 100 data writings to the track N. Hence, the write count $C_N$ represents the result of estimating that the data writing to the track N has been done $100 \times C_N$ times. The initial value of the write count $C_N$ is zero.

Next, the controller 17 functions as a write count determination module to determine whether the write count $C_N$ has reached the threshold "100" (block 505). The threshold "100" is determined from the probability that the random number R generated in block 502 is 1 (the predetermined value) (that is, 1/100) and the refresh threshold $C_P$ ($C_P$=10,000). More specifically, the threshold "100" is determined by multiplying the refresh threshold $C_P$ ($C_P$=10,000) by the probability (1/100).

If the write count $C_N$ has not reached the threshold "100" (NO in block 505), the controller 17 estimates that the number of data writings to the track N has not reached 10,000 (the refresh threshold $C_P$). The reason of estimation is as follows. First, that the write count $C_N$ has not reached the threshold "100" means that the number of times the random number R generated in accordance with the data writing to the track N is 1 has not reached 100. The probability that the random number R is 1 is 1/100. Hence, if the determination of block 505 ends with "NO", the controller 17 can estimate that the number of data writing to the track N has not reached 10,000. In this case, the controller 17 ends the data write processing according to the flowchart of FIG. 5.

On the other hand, if the write count $C_N$ has reached the threshold "100" (YES in block 505), the controller 17 estimates that the number of data writings to the track N has reached 10,000. In this case, the controller 17 functions as the refresh module to refresh the tracks N±1 adjacent to the track N (block 506). The controller 17 returns the write count $C_N$ to the initial value of zero (block 507) and ends the data write processing according to the flowchart of FIG. 5.

According to the second modification, the controller 17 increments the write count $C_N$ in case that the random number R generated in accordance with the data writing to the track N with an occurrence probability of 1/100 is 1 (the predetermined value). The write count $C_N$ that is necessary for estimating that the number of data writings to the track N has reached 10,000 need only be counted to 100 by the controller 17. Hence, in the second modification, a 7-bit memory area suffices for holding the write count $C_N$. This is apparent from that $2^7$ equals 128. That is, according to the second modification, in case that the write count of each track needs to be counted up to 10,000, the necessary memory area can be halved as compared to the related art that requires a 14-bit memory area per track. Additionally, the second modification can improve the estimation accuracy as compared to the above-described embodiment in which whether the write count of the track N is reached 10,000 is estimated based on the random number R with an occurrence probability of 1/10,000, although the estimation accuracy is lower than in the case in which the write count of each track is counted up to 10,000.

<Third Modification>

The third modification of the embodiment will be described next.

The third modification considers a case in which the side-erase effect caused by data writing to the track N affects not only the tracks N±1 adjacent to the track N but also the tracks N±2, like in the first modification. Like in the first modification, the influence of the side-erase effect on the tracks N±2 caused by the data writing to the track N is assumed to be 50% influence on the tracks N±1 caused by the data writing to the track N.

The combination of generation of the random number and counting of the write count for each track is used to estimate even the influence on the tracks N±2, like in the second modification. Both of write count $C_{N+1}$ for the track N+1 and write count $C_{N-1}$ for track N−1 is incremented once in 100 data writings to the track N. Further, each of write count $C_{N+2}$ for the track N+2 and write count $C_{N-2}$ for track N−2 is incremented once in 200 data writings to the track N.

A typical procedure of the data write processing including refresh according to the third modification will be described below with reference to the flowcharts of FIGS. 6 and 7 by exemplifying data writing to the track N.

First, the controller 17 writes data to the track N (block 601). Next, the controller 17 functions as the random number generation module to generate the random number Ra within the range of 1 to 100 with an occurrence probability of 1/100 (block 602). The controller 17 then functions as a random number determination module to determine whether the generated random number Ra is the predetermined value, for example, 1 (block 603). If the generated random number R is not 1 (NO in block 603), the controller 17 advances to block 701.

On the other hand, if the generated random number Ra is 1 (YES in block 603), the controller 17 increments each of the write count $C_{N+1}$ for the track N+1 and the write count $C_{N-1}$ for the track N−1 by one (block 604). The probability that the random number Ra generated in block 602 is 1 is 1/100. Hence, the controller 17 increments write count $C_{N+1}$ and the write count $C_{N-1}$ once in 100 data writings to the track N. The initial value of the write counts $C_{N+1}$ and $C_{N-1}$ is zero.

The track N+1 and the track N−1 are adjacent not only to the track N but also to the track N+2 and the track N−2. For this reason, the write counts $C_{N+1}$ and $C_{N-1}$ are also incremented once in 100 data writings to the track N+2 and the track N−2. The write count $C_{N+1}$ is also incremented once in 200 data writings to track N+3 and the track N−1, as can easily be understood from block 701 to block 703 to be described later. The write count $C_{N-1}$ is also incremented once in 200 data writings to tracks N+1 and N−3. This indicates that concerning the write count $C_{N+1}$ for the track N+1, two data writings to the track N+3 or the track N−1 are handled as one data writing to the tracks adjacent to the track N+1.

Hence, in the third modification, the weight of the influence of the side-erase effect on tracks N±2 caused by the data writing to a track N is half of the weight of the influence of the side-erase effect on tracks N±1. The value obtained by multiplying the write count for each track by 100 represents a converted estimated value of the number of data writings to an adjacent track in consideration of the weight of the influence of the side-erase effect. That is, the value obtained by multiplying the write count by 100 represents the converted estimated value of the number of times that the track is affected by the side-erase effect caused by the data writing.

Next, the controller 17 functions as the write count determination module to determine whether the write count $C_{N+1}$ has reached the threshold "100" (block 605). If the write count $C_{N+1}$ has not reached the threshold "100" (NO in block 605), the controller 17 estimates that the converted value of the number of times that the track N+1 is affected by the side-erase effect has not reached 10,000. In this case, the controller 17 advances to block 608.

On the other hand, if the write count $C_{N+1}$ has reached the threshold "100" (YES in block 605), the controller 17 determines that the converted value of the number of times that the track N+1 is affected by the side-erase effect may reach 10,000. In this case, the controller 17 functions as the refresh module to refresh the track N+1 (block 606). The controller 17 returns the write count $C_{N+1}$ to the initial value, which the initial value is zero (block 607) and the process advances to block 608.

In block 608, the controller 17 functions as the write count determination module to determine whether the write count $C_{N-1}$ has reached the threshold "100". If the write count $C_{N-1}$ has not reached the threshold "100" (NO in block 608), the process advances to block 701.

On the other hand, if the write count $C_{N-1}$ has reached the threshold "100" (YES in block 608), the controller 17 determines that the converted value of the number of times that the track N−1 is affected by the side-erase effect may reach 10,000. In this case, the controller 17 functions as the refresh module to refresh the track N−1 (block 609). The controller 17 returns the write count $C_{N-1}$ to the initial value of zero (block 610) and the process advances to block 701.

In block 701, the controller 17 functions as the random number generation module to generate the random number Rb within the range of 1 to 200. This range is set considering that the influence of the side-erase effect on the tracks N±2 caused by the data writing to the track N is 50% of the influence of the side-erase effect on the tracks N±1. The controller 17 then functions as a random number determination module to determine whether the generated random number Rb is the predetermined value, for example, 1 (block 702). If the generated random number Ra is not 1 (NO in block 702), the controller 17 ends the data write processing according to the flowcharts of FIGS. 6 and 7.

On the other hand, if the generated random number Rb is 1 (YES in block 702), the controller 17 functions as the increment module to increment each of the write count $C_{N+2}$ for the track N+2 and the write count $C_{N-2}$ for the track N−2 by one (block 703). The probability that the random number Rb generated in block 701 is 1 is 1/200. Hence, the controller 17 increments the write count $C_{N+2}$ and $C_{N-2}$ once in 200 data writings to the track N. The initial value of the write count $C_{N+2}$ and the write count $C_{N-2}$ is zero.

The write count $C_{N+2}$ and the write count $C_{N-2}$ are also incremented once in 200 data writings to track N+4 and track N−4. The write count $C_{N+2}$ is also incremented once in 100 data writings to each of the track N+3 and the track N+1, as can easily be understood from block 602 to block 604 described above. The write count $C_{N-2}$ is also incremented once in 100 data writings to the track N−1 and track N−3.

Next, the controller 17 functions as the write count determination module to determine whether the write count $C_{N+2}$ has reached the threshold "100" (block 704). If the write count $C_{N+2}$ has not reached the threshold "100" (NO in block 704), the controller 17 determines that the converted value of the number of times that the track N+2 is affected by the side-erase effect has not reached 10,000. In this case, the process advances to block 707.

On the other hand, if the write count $C_{N+2}$ has reached the threshold "100" (YES in block 704), the controller 17 estimates that the converted value of the number of times that the track N+2 is affected by the side-erase effect may reach 10,000. In this case, the controller 17 functions as the refresh module to refresh the track N+2 (block 705). The controller 17 returns the write count $C_{N+2}$ to the initial value of zero (block 706) and the process advances to block 707.

In block 707, the controller 17 functions as the write count determination module to determine whether the write count $C_{N-2}$ has reached the threshold "100". If the write count $C_{N-2}$ has not reached the threshold "100" (NO in block 707), the controller 17 estimates that the converted value of the number of times that the track N−2 is affected by the side-erase effect has not reached 10,000. In this case, the controller 17 ends the data write processing according to the flowcharts of FIG. 6 and FIG. 7.

On the other hand, if the write count $C_{N-2}$ has reached the threshold "100" (YES in block 707), the controller 17 determines that the converted value of the number of times that the track N−2 is affected by the side-erase effect may reach 10,000. In this case, the controller 17 functions as the refresh module to refresh the track N−2 (block 708). The controller 17 returns the write count $C_{N-2}$ to the initial value of zero (block 709) and ends the data write processing according to the flowcharts of FIG. 6 and FIG. 7.

In the third modification, for example, the write count $C_{N+1}$ for the track N+1 reflects not only the data writing to the track N but also the data writing to the track N+2, the data writing to the track N+3, and the data writing to the track N−1 in accordance with the degree of the influence of the corresponding side-erase effect. For this reason, according to the third modification, the above-described estimation accuracy can be improved as compared to, for example, the first modification in which the influence of the side-erase effect on the track N+1 is determined independently for each of the data writing to the track N+2, the data writing to the track N, the data writing to the track N+3, and the data writing to the track N−1. This can further suppress unnecessary refresh.

In the first and third modifications, it is assumed that the influence of the side-erase effect on the tracks N±2 caused by data writing to the track N is 50% that on the tracks N±1. However, the influence of the side-erase effect on the tracks N±2 is not necessarily 50% of the influence of the side-erase effect on the tracks N±1. Depending on the state of the head 12 (for example, the state of the tilt with respect to the disk 11 or the state of the skew angle with respect to a track on the disk 11), the influence of the side-erase effect on the tracks N±2 may be larger than the influence of the side-erase effect on the tracks N±1.

In the above-described embodiment, the first modification, the second modification, and the third modification, it is assumed that the refresh threshold $C_P$ is 10,000. However, the refresh threshold $C_P$ is not necessarily 10,000. The refresh threshold $C_P$ may be set for each ring-shaped area of the disk 11 where a corresponding track is located, for example, for each of the inner area, intermediate area, and outer area of the disk 11. In a magnetic disk apparatus having a head arranged in correspondence with each of the surfaces of the disk 11, the refresh threshold $C_P$ may be set for each head. The refresh threshold $C_P$ may be set dynamically in accordance with the ambient temperature of the magnetic disk apparatus or the level of a vibration applied to the magnetic disk apparatus. The refresh threshold $C_P$ may be set in accordance with a combination of at least two of the above-described head, ring-shaped area of the disk 11, the ambient temperature, and the level of a vibration.

<Fourth Modification>

The fourth modification of the embodiment will be described next.

In the above-described embodiment, the first modification, the second modification, and the third modification, it is assumed that the side-erase effect affects on the whole neighboring tracks N±1 upon both data writing to the entire track N and data writing to a partial region (more specifically, some sectors) of the track N. For this reason, in the above-described embodiment, the first modification, the second modification, and the third modification, the refresh is done on the track basis. However, the range of the neighboring tracks N±1 affected by the side-erase effect differs between that upon data writing to the entire track N and that upon the data writing to the partial area of the track N.

Figure 8:
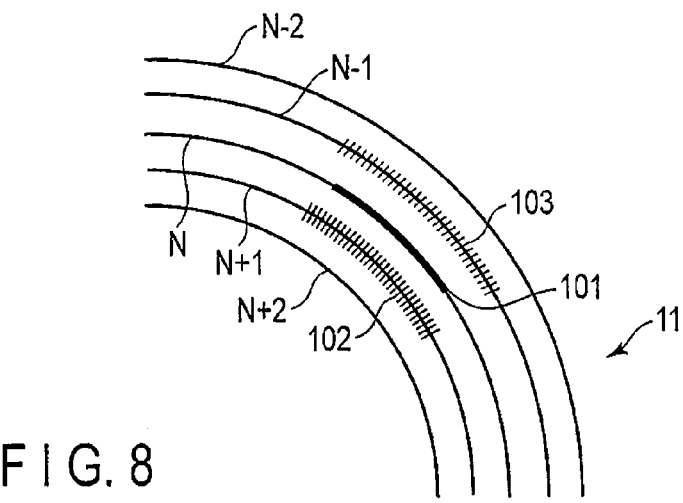
FIG. 8 is an exemplary view showing a typical example of a range of neighboring tracks N±1 affected by a side-erase effect caused by data writing to a partial area of a track N.

FIG. 8 shows a typical example of the range of the neighboring tracks N±1 affected by the side-erase effect caused by the data writing to the partial area of the track N.

Referring to FIG. 8, an area 101 of the track N represents an area where data is written. Each of areas 102 and 103 of the tracks N+1 and N−1 represents a range affected by the side-erase effect caused by data writing to the area 101.

As in the above-described embodiment, the first modification, the second modification, and the third modification, it is assumed that the side-erase effect caused by the data writing to the area 101 affects the entire tracks N+1 and N−1, and the refresh is performed in each track. In this case, areas of the tracks N+1 and N−1, which do not need the refresh, are also refreshed. That is, unnecessary the refresh occurs in the partial areas of the tracks.

In the fourth modification, the refresh is performed only in the range affected by the side-erase effect caused by the data writing. For example, if the write count is estimated using only the random number, as in the above-described embodiment, the construction for performing the refresh for each sector that is the minimum recording unit is also applicable. That is, generating the random number in accordance with writing to the first sector (first area) of the track N makes it possible to detect the influence of the side-erase effect on the corresponding second sector of the neighboring track N+1 and the corresponding third sector of the neighboring track N−1 (second area). From the viewpoint of practical use, however, each track is divided into a plurality of areas (for example, four areas) each formed from two or more sectors, and the influence of the side-erase effect is detected for each of the divided areas. In a magnetic disk apparatus in which the number of sectors per track differs between an inner track and an outer track of the disk 11, for example, each track may be divided into a plurality of areas at an almost predetermined azimuth (for example, 90°) with respect to the center of the disk 11. In the fourth modification, random number generation, and the write count for each track and for each area of the track may be combined.

According to at least one embodiment described above, it is possible to provide a magnetic disk apparatus capable of obviating or reducing the memory capacity to be used to hold the write count and also capable of suppressing the unnecessary data refresh, and a data refresh method in the same magnetic disk apparatus.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk apparatus comprising:
   a disk;
   a random number generator to generate random numbers selected from one to N, each of the random numbers being generated with an occurrence probability of 1/N when data is written to a part of a first track of the disk, N being a positive integer greater than one;

a memory to store a normalized write count associated with the part of the first track, the normalized write count being a write count normalized by M, M being a positive integer; and a refresh module to refresh a part of a second track when the generated random number is equal to a predetermined number and the normalized write count is equal to M.

2. The apparatus of claim 1, wherein the part of the first track and the part of the second track comprise a whole area of the first track and a whole area of the second track, respectively.

3. The apparatus of claim 1, wherein
the first track comprises areas,
the part of the first track comprises one of the areas of the first track,
the second track comprises areas, and
the part of the second track comprises one of the areas of the second track.

4. The apparatus of claim 1, wherein N and M are smaller than a refresh threshold.

5. The apparatus of claim 1, wherein a value of N×M is in accordance with a magnitude of influence of a side-erase effect on the part of the second track.

6. The apparatus of claim 1, further comprising:
an increment module to increment the normalized write count when the generated random number is equal to the predetermined number, and
wherein the refresh module refreshes the part of the second track when the generated random number is equal to a predetermined number and the normalized write count is equal to M after the normalized write count is incremented.

7. The apparatus of claim 1, further comprising:
a determination module to determine whether the generated random number is equal to the predetermined number.

8. The apparatus of claim 1, wherein the part of the second track is affected by a side-erase effect caused when the data is written to the part of the first track.

9. A method of refreshing data in a magnetic disk apparatus comprising a disk, the method comprising:

generating random numbers selected from one to N, each of the random numbers being generated with an occurrence probability of 1/N when data is written to a part of a first track of the disk, N being a positive integer greater than one;

storing a normalized write count associated with the part of the first track, the normalized write count being a write count normalized by M, M being a positive integer; and refreshing a part of a second track when the generated random number is equal to a predetermined number and the normalized write count is equal to M.

10. The method of claim 9, wherein the part of the first track and the part of the second track comprise a whole area of the first track and a whole area of the second track, respectively.

11. The method of claim 9, wherein
the first track comprises areas,
the part of the first track comprises one of the areas of the first track,
the second track comprises areas, and
the part of the second track comprises one of the areas of the second track.

12. The method of claim 9, wherein N and M are smaller than a refresh threshold.

13. The method of claim 9, wherein a value of N×M is in accordance with a magnitude of influence of a side-erase effect on the part of the second track.

14. The method of claim 9, further comprising:
incrementing the normalized write count when the generated random number is equal to the predetermined number, and
wherein the refreshing comprises refreshing the part of the second track when the generated random number is equal to a predetermined number and the normalized write count is equal to M after the normalized write count is incremented.

15. The method of claim 9, further comprising:
determining whether the generated random number is equal to the predetermined number.

16. The method of claim 9, wherein the part of the second track is affected by a side-erase effect caused when the data is written to the part of the first track.

* * * * *